United States Patent [19]
Bauer et al.

[11] 3,875,962
[45] Apr. 8, 1975

[54] RESILIENT SYSTEM FOR MULTI-RING COMPRESSOR VALVES

[75] Inventors: Friedrich Bauer; Günter Hofstädter, both of Vienna, Austria; Robert Köhler, Schongau, Lech, Germany

[73] Assignee: Hoerbiger Ventilwerke Aktiengesellschaft, Vienna, Austria

[22] Filed: Nov. 19, 1973

[21] Appl. No.: 417,409

[30] Foreign Application Priority Data
Nov. 20, 1972 Austria .................... 9848/72

[52] U.S. Cl. .................... 137/516.21; 137/529
[51] Int. Cl. .................... F16k 15/08
[58] Field of Search ....137/516.11–516.23, 514, 529

[56] References Cited
FOREIGN PATENTS OR APPLICATIONS
| | | | |
|---|---|---|---|
| 788,268 | 12/1957 | United Kingdom | 137/516.19 |
| 922,132 | 1/1955 | Germany | 137/516.15 |

Primary Examiner—Robert G. Nilson
Attorney, Agent, or Firm—Watson, Cole, Grindle & Watson

[57] ABSTRACT

A resilient system for a multi-ring compressor valve having a valve seating member, a catcher plate member and a valve plate member coaxial and movable with respect to the valve seating member, and at least two adjacent resilient plate members coaxial with said valve seating member and said catcher plate member, the improvement consisting in that said at least two resilient plate members are disposed in inverted relationship to each other, each said resilient plate comprising at least two concentric rings interconnected by radial webs, ring sections of at least two said concentric rings, which extend between any two said radial webs, being protuberant in opposed axial directions from the plane of the plate, adjacent said resilient plates being displaced relative to each other through an angle, in the plane of the plate, which is half the angle between adjacent radial webs.

2 Claims, 5 Drawing Figures

PATENTED APR 8 1975 3,875,962

RESILIENT SYSTEM FOR MULTI-RING COMPRESSOR VALVES

The present invention relates to a resilient system for multi-ring compressor valves, and to resilient plates which are utilized in such a system.

It is known to load the valve plate of a compressor valve with a plurality of resilient plates (as compared to a single resilient plate), the resilient plates having identical shape, and being positioned in parallel, identical relationship to one another. In this known arrangement, the forces of the resilient portions of the plates add to one another so that it is possible, in using one and the same form of construction of resilient plate and through altering the number of resilient plates installed in the arrangement, to vary the spring force acting on the valve plate. Advantage is taken of this known arrangement for the purpose of using the same resilient plates both in a suction valve and in a delivery or discharge valve. As is known, the latter valve requires relatively large spring forces.

In the case of another known arrangement two separate rings are provided with a curvature resembling that of a cylinder surface portion, the concave faces of these separate rings being arranged to face one another, and one of the two rings being turned through an angle of 90° relative to the other. It is intended, by means of this arrangement, to prevent the hard springs from scraping, at their edges, on the valve plate or on the catcher plate of the valve. In this arrangement also the forces of the two resilient plates add to one another.

The present invention includes resilient plates which have sufficient thickness to give the strength required in practice and which form a resilient system which enables comparatively low spring forces to be exerted over a sufficiently long path of spring motion. The proposed resilient system is distinguished by further advantages, particularly by a favorable spring characteristic over the whole working stroke of the valve plate, and also by a satisfactory guidance of the valve plate and satisfactory damping of impact shocks of the latter.

According to the present invention there is provided a resilient system for a multi-ring compressor valve having at least two adjacent, coaxial, resilient plates in inverted relationship to each other, each said resilient plate comprising at least two concentric rings interconnected by radial webs, ring sections of at least two said concentric rings, which extend between any two said radial webs, being protuberant in opposite axial directions from the plane of the plate, wherein adjacent said resilient plates are displaced relative to each other through an angle, in the plane of each plate, which is substantially half the angle between adjacent radial webs.

Preferably each resilient plate has two said radial webs diametrally arranged, the two ring sections of any one concentric ring being protuberant in the same axial direction such that together their curvature is substantially that of the surface portion of the cylinder.

Furthermore, according to the present invention there is provided a resilient plate for a multi-ring compressor valve comprising at least two concentric rings interconnected by radial webs, ring sections of at least two said concentric rings, which extend between any two said radial webs, being protuberant in opposite axial directions from the plane of the plate, said webs lying in the plane of the plate.

As a result of the system proposed according to the invention, the resilient plates, one of which lies above the other, avoid that the resilient forces exerted by these plates add to one another. Moreover, the protuberant ring sections or portions which are supported on the valve plate and on the catcher plate are series-arranged, so that the total resilient force exerted is not increased through the use of two or more resilient plates. The forces exerted, by the resilient ring sections which are protuberant towards each other and which lie one on the other, do in fact add to one another, although this addition only takes place shortly before the end of the opening stroke of the valve plate, so that the impact shocks occurring at this time are damped, with concomitant advantage. The resilient system according to the invention is, accordingly, distinguished by relatively weak spring forces which are effective in the course of a long path of spring motion, attained without adversely loading the constituent materials; also by a favourable spring characteristic of the resilient system.

Protuberant resilient plates, having ring sections or portions which have been permanently curved from the plane of the plates, in which the webs lie, have hitherto only been used singly or by arranging one resilient plate above the other, these resilient plates being identically positioned for the purpose of spring-loading the compressor valves. In these hitherto adopted arrangements the resilient forces exerted have been added to each other when two or more resilient plates have been used together so that, although a stepwise increase of the resilient force exerted has been attained, no other advantages have been realised.

The concentric rings of the two resilient plates of the present invention can be interconnected, by radial webs, along a single diametral line of the plate, the ring sections of a concentric ring between the radial webs being bent in opposite axial directions so as to at least approximately assume the shape of a surface portion of a cylinder. In this way the greatest possible length of the protuberant ring sections is realized, with correspondingly small spring forces being exerted.

Further details and advantages of the present invention will become apparent from the following description of specific embodiments, which are illustrated by way of example in the accompanying drawings, in which.

Figure 1:
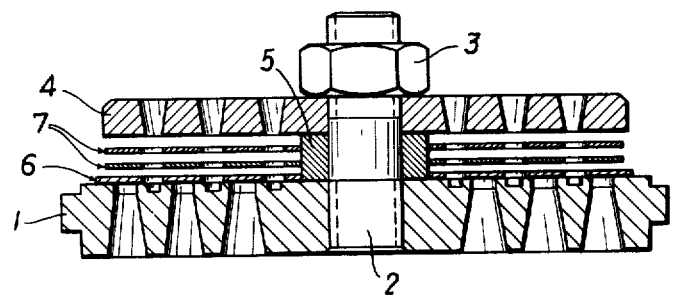
FIG. 1 is an axial cross-sectional view taken through a multi-ring compressor valve, provided with a resilient system according to the invention.

The multi-ring compressor valve shown in FIG. 1 consists of a valve seating 1, to which a catcher plate 4 is fixed by means of a screw 2 and a nut 3. The valve seating 1 and the catcher plate 4 are spaced from one another by a guide ring 5. A valve plate 6 bears against the valve seating 1 through two resilient plates 7.

Figure 2:
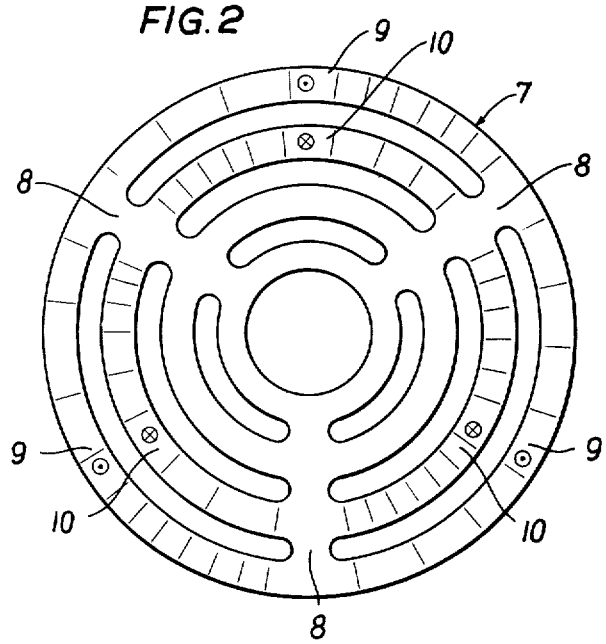
FIG. 2 is a plan view of a resilient plate.

FIG. 2 is a plan view of a resilient plate 7. This plate 7 consists of concentric rings, which are interconnected by radial webs 8. Ring sections 9 lie between the radial webs 8 and form part of the outer ring of the resilient plate while the ring sections of the inwardly adjacent ring are shown as 10. Encircled dots and crosses in FIG. 2 indicate that the ring sections 9, 10 are curved upwardly and downwardly respectively from the plane of the plate passing through webs 8. The two innermost rings are planar, and lie in the plane passing through the radial webs 8.

Figure 3:
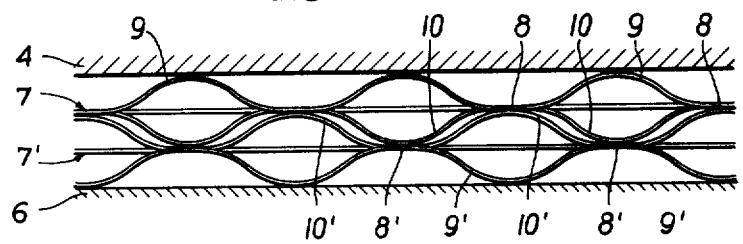
FIG. 3 is a diagrammatic, developed view of the proposed resilient system.

FIG. 3 is a diagrammatic development, illustrating the manner in which the two resilient plates 7 shown in FIG. 2 lie one above the other so as to form the resilient system according to the invention. The two plates are designated 7 and 7'. Both these plates 7, 7' are of identical shape, but are juxtaposed in inverted position relative to each other, while at the same time one of them has been turned, in the plane of the plates 7 or 7', through an angle which corresponds to half of the angle between adjacent webs 8. Thus, in the case of the resilient plate illustrated in FIG. 2, one of the resilient plates 7, 7' has been turned through an angle of 60° (30°) in the plane of these two plates, relative to the other. As can be seen from FIG. 3, the ring sections 9 of the upper resilient plate 7 are curved upwardly from the plane passing through the webs 8, whereas the ring sections 10 are curved downwardly from the plane of the resilient plate 7, the lowermost arcuate portion of these ring sections 10 lying in the vicinity of the radial webs 8' of the resilient plates 7'. In contradistinction to this, the ring sections 9' of the resilient plates 7' are curved downwardly from the plane of the plate 7', whereas the ring sections 10' are curved upwardly from the same plane.

Owing to the fact that one of the two resilient plates 7, 7' has been turned, relative to the other, through an angle which corresponds to half of the angle between adjacent webs 8, the protuberant ring sections 10, 10' engage in one another, round the circumference of the plate 7, 7' in the manner of a toothed ring. Thus, the protuberant ring sections 10 are in contact with the radial webs 8 of spring plate 7, while the protuberant sections 10' of the other resilient plate 7' are in contact with the radial webs 8 of resilient plate 7. By virtue of this interlocking arrangement of the two resilient plates 7, 7' there is realised a stable relative position in which the plates cannot turn relative to each other. The total spring force exerted is determined by the stiffness of the protuberant portions 9, 9'. As the resilient forces exerted by the sections 9, 9' are series-arranged, these resilient forces are not added to each other, so that the spring system is comparatively soft over a relatively long path of spring motion. The protuberant portions 10, 10' only become operative — their resilient forces adding to one another — towards the end of this path of spring motion, that is to say as soon as the protuberant portions 9, 9' have been practically completely pressed into the plane of the plates. In the case of a spring system of this kind, which is built into a compressor valve, this condition is arrived at shortly before the valve plate 6 reaches the end of its working stroke, when it strikes against the catcher plate 4. Owing to the fact that the protuberant portions 10, 10' have now become operative, the spring force exerted increases relatively sharply, with the result that the impact on the valve plate 6 on the catcher plate 4 is effectively damped.

Figure 4:
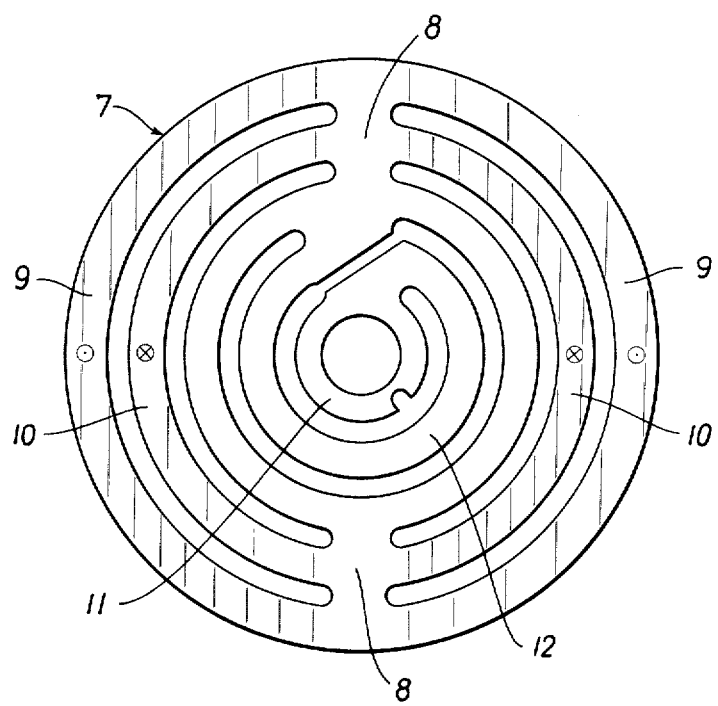
FIG. 4 illustrates a plan view of another proposed resilient plate.
Figure 5:
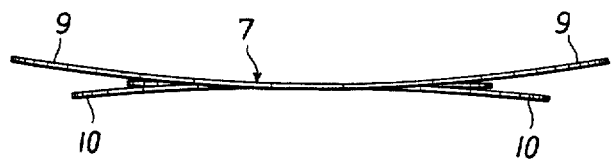
FIG. 5 shows a side view of the resilient plate of FIG. 4.

In the case of the embodiment illustrated in FIGS. 4 and 5 the concentric rings of the resilient plates 7 lie to either side of, and are interconnected by, radial webs 8 which are aligned with a single diametral line of the plate 7. As is apparent from FIG. 5, the ring sections 9, 10 between the radial webs 8 are protuberant in opposite, axial directions, so that the ring sections of each concentric ring somewhat resemble a surface portion of a cylinder. The ring sections 9 of the outermost ring are curved upwardly from the plane of the plate 7 extending through the radial webs 8, whereas the ring sections 10 of the inwardly adjacent ring are curved downwardly from the same plane of plate 7. A hub 11 lies at the center of the resilient plate 7, as does also a flexible guide arm 12 which permits friction-free guidance to be accomplished. Two resilient plates of this kind are, as in the previously described embodiment, assembled together to form a resilient system according to the invention. Accordingly, one of the resilient plates is turned upside down relative to the other, and is also turned, in its own plane, through an angle which corresponds to half the spacing between adjacent webs 8. In the case of this embodiment of the invention, one of the resilient plates is thus turned, in its own plane, through an angle of 90° relative to the other plate. A spring system of this kind is distinguished by a particularly low resilient force, because the protuberant ring sections which supply the spring force are relatively long.

The present invention does not exclude an arrangement whereby more than two resilient plates may be assembled together to form a satisfactory resilient system. Furthermore, the protuberant resilient plates, used for forming the said resilient system, may be shaped in any desired manner. In particular, these resilient plates may have any desired number of radial webs, and any desired number of concentric rings. All or only some of the rings may be curved, in opposite axial directions, from the plane of the resilient plate concerned. Any of the rings which are of planar (i.e., non-protuberant) shape do not contribute to the resilient force exerted by the resilient system, but facilitate the axial guidance of the spring-loaded valve plate. It will be readily understood that it is possible, in a variant of the subject matter of the embodiments described above, to arrange for the sections of one and the same ring of a resilient plate to be protuberant in opposite axial directions.

We claim:

1. In or for a resilient system for a multi-ring compressor valve having a valve seating member, a catcher plate member and a valve plate member coaxial and movable with respect to the valve seating member, and at least two adjacent resilient plate members coaxial with said valve seating member and said catcher plate member, the improvement consisting in that said at least two resilient plate members are disposed in inverted relationship to each other, each said resilient plate comprising at least two concentric rings interconnected by radial webs, ring sections of at least two said concentric rings, which extend between any two said radial webs, being protuberant in opposed axial directions from the plane of the plate, said adjacent resilient plates being displaced relative to each other through an angle, in the plane of the plate, which is half the angle between adjacent radial webs.

2. The resilient system according to claim 1 wherein each resilient plate member has two said radial webs diametrally arranged, the two ring sections of any one concentric ring being protuberant in the same axial direction such that together their curvature is substantially that of the surface portion of a cylinder.

\* \* \* \* \*